United States Patent
Bøe et al.

[11] Patent Number: 5,997,045
[45] Date of Patent: Dec. 7, 1999

[54] PIPE JOINT

[75] Inventors: Einar Bøe; Hans-Paul Carlsen, both of Notodden; Stig Holgersen, Hinna; Olav Sveinung Haugerud, Bø i Telemark, all of Norway

[73] Assignee: Norsk Hydro ASA, Olso, Norway

[21] Appl. No.: 08/776,573

[22] PCT Filed: Jul. 21, 1995

[86] PCT No.: PCT/NO95/00132

§ 371 Date: Apr. 21, 1997

§ 102(e) Date: Apr. 21, 1997

[87] PCT Pub. No.: WO96/04502

PCT Pub. Date: Feb. 15, 1996

[30] Foreign Application Priority Data

Aug. 3, 1994 [NO] Norway ...................................... 942889

[51] Int. Cl.⁶ ............................................ F16L 35/00
[52] U.S. Cl. ............................ 285/26; 285/55; 285/119; 285/124.1; 285/148.19; 285/330
[58] Field of Search .................... 285/124.1, 330, 285/148.19, 26, 55, 119

[56] References Cited

U.S. PATENT DOCUMENTS

| | | | |
|---|---|---|---|
| 3,406,989 | 10/1968 | Gross | 285/148.19 X |
| 4,148,495 | 4/1979 | Zon | 285/124.1 X |
| 4,367,888 | 1/1983 | Leverberg | 285/124.1 X |
| 4,607,691 | 8/1986 | Bridges . | |
| 4,836,305 | 6/1989 | Curlett . | |
| 4,846,508 | 7/1989 | Pallini et al. | 285/148.19 X |
| 5,048,871 | 9/1991 | Pfeiffer et al. | 285/148.19 X |
| 5,056,829 | 10/1991 | Kramer | 285/124.1 X |
| 5,163,721 | 11/1992 | Babuder . | |

FOREIGN PATENT DOCUMENTS

| | | |
|---|---|---|
| 0060549 | 3/1982 | European Pat. Off. . |
| 1124199 | 3/1967 | United Kingdom . |
| 1164335 | 3/1967 | United Kingdom . |
| 2063410 | 11/1980 | United Kingdom . |

*Primary Examiner*—Dave W. Arola
*Attorney, Agent, or Firm*—Wenderoth, Lind & Ponack, L.L.P.

[57] ABSTRACT

Pipe joint for joining two pipe end sections (1, 1'), the pipes support in their walls one or more bores (7) and/or lines or conduits (8) for hydraulic or electrical energy transfer. The pipe joint comprises a pipe union (3) with internal threads (13, 13'), one section thereof is threaded to the right, and another to the left. These threads correspond respectively with similar external threads (6, 6') at the pipe ends. A joining part (2) is arranged between the two pipe ends, and serves to mutually center and lock the pipe end sections. In the joining part (2) there is arranged joining sleeves (4) for each bore (7) or line (8), to obtain a tight joint between these.

14 Claims, 4 Drawing Sheets

ID="1"
PIPE JOINT

BACKGROUND OF THE INVENTION

This invention relates to a pipe joint for joining the ends of two pipes for hydraulic or electrical signal or energy transfer. The pipes have one or more longitudinal bores and/or lines or conduits in their walls. The joint comprises a pipe union having internal threads with one section threaded to the left and another section threaded to the right, corresponding respectively to external threads on the pipe end sections.

In production of oil and/or gas from a reservoir in a geological formation it is desirable to transfer signals concerning production and equipment parameters, or it may be desirable to transmit electrical or hydraulic energy to equipment being used in the reservoir, e.g. for controlling or operation of valves or the like. Often it may be desirable to supply a fluid to the reservoir, e.g. a tracer, a packing fluid or a solution/cleaning agent.

Previously it has been attempted to arrange lines in the walls of a production pipe in an oil/gas well, to transfer signals, energy or a liquid as mentioned above. A production pipe of this type consists of several pipe sections interconnected by pipe joints. However, these state of the art joints do not satisfy the demand of fluid tightness and do not have the necessary performance characteristics. One example of a known pipe joint is disclosed in EP 0 489 137 B1.

SUMMARY OF THE INVENTION

It is therefore an object of the present invention to provide an improved pipe joint of the above mentioned type, which is durable, simple and inexpensive to produce. A further object of the present invention is to provide a joint which facilitates the joining of two pipe ends, and a joint which can withstand high pressures.

According to the present invention, the above mentioned advantages are achieved by a pipe joint that is characterized in that the pipe ends are provided with a joining part for mutually centering and locking the two pipe ends. The joining part has joining sleeves that connect the respective bores or lines with each other in order to obtain a tight connection therebetween.

BRIEF DESCRIPTION OF THE DRAWINGS

One way of carrying out the invention is described in detail below with reference to accompanying drawings which illustrate one specific embodiment in which.

DETAILED DESCRIPTION OF THE INVENTION

Figure 1:
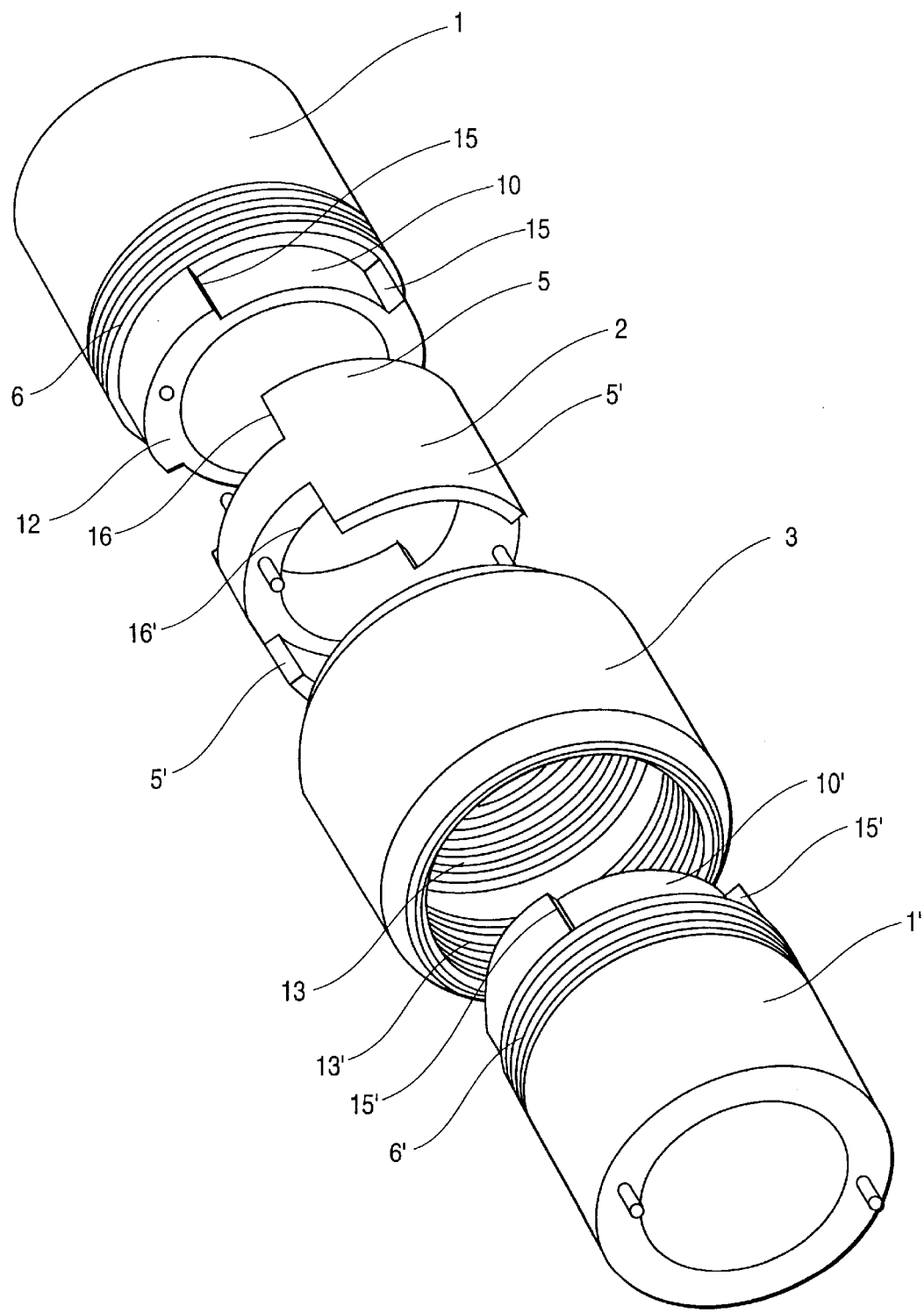
FIG. 1 is an exploded view of a pipe joint constructed in accordance with the present invention.

As mentioned above, FIG. 1 shows an exploded view of a pipe joint according to the invention. Between the pipes 1, 1' (only end sections shown here) the joint comprises a joining part 2. The pipes 1, 1' and the joining part are adapted to be connected by means of a pipe union 3, which is provided with two internal threaded sections 13, 13'. One section is threaded to the right, and the other section is threaded to the left. The threaded sections correspond respectively to external right and left oriented threads 6, 6' formed at the end sections of the pipes.

Figure 2A:
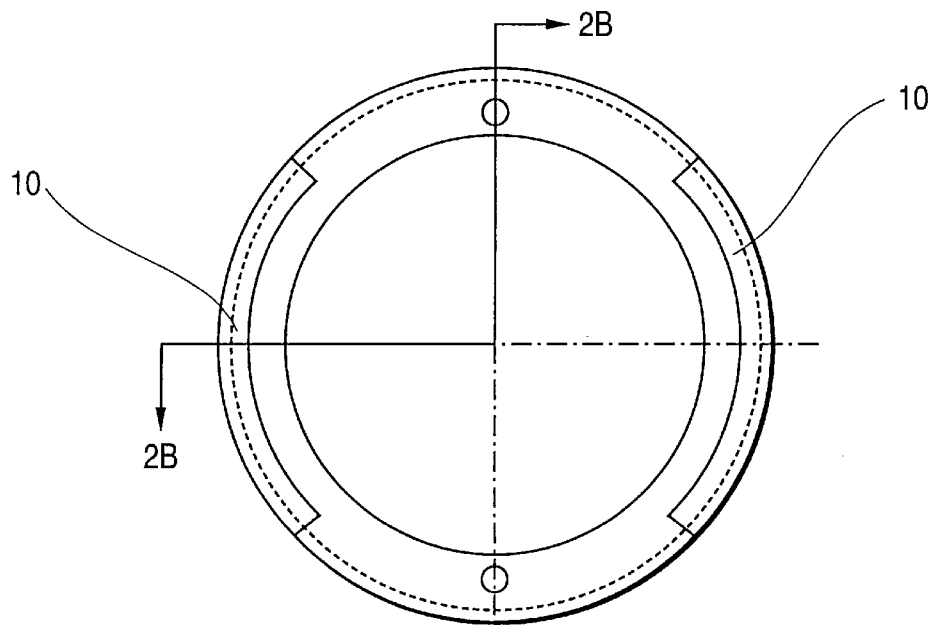
FIG. 2A is an enlarged view of one of the two similar pipe ends as shown in FIG. 1.
Figure 2B:
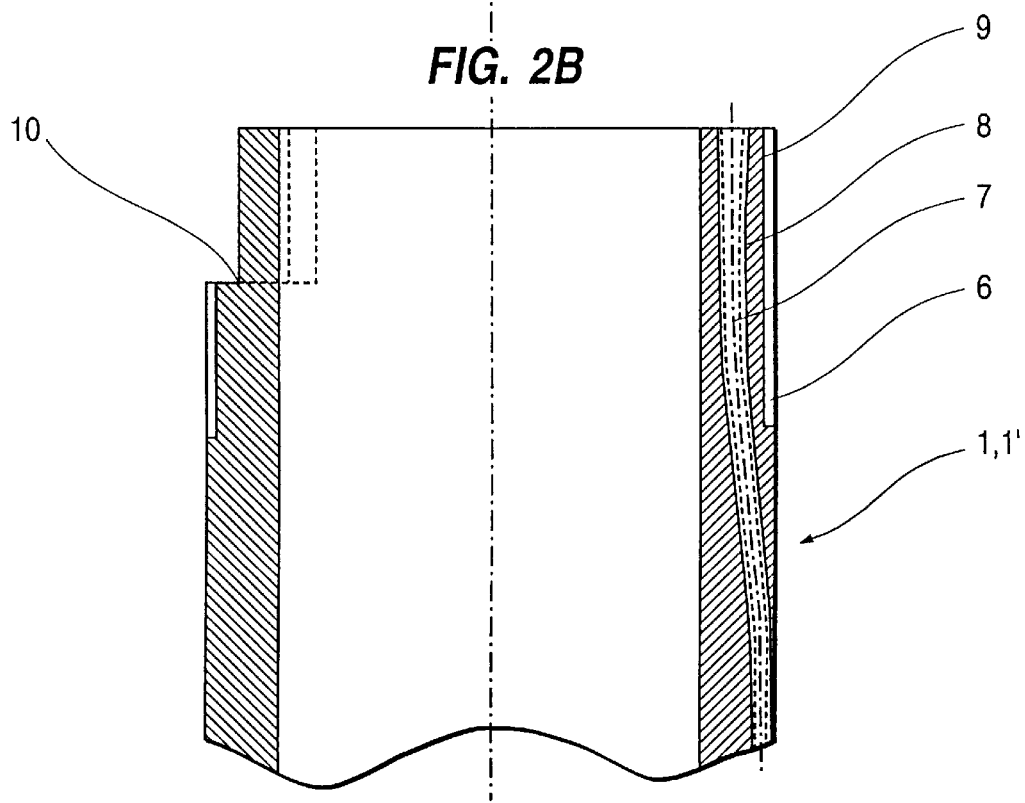
FIG. 2B is a sectional view taken along section lines 2B—2B.

The pipes, or more precisely the pipe end sections, in the joint are identical. Therefore, for practicable reasons, only one pipe end 1 is shown in FIG. 2. As will be seen, the pipe end section 1 has two external recesses which are diametrically opposed to each other (see also FIG. 1). The recesses 10 serve as female parts corresponding to male parts 5 which are formed at the joining part 2.

The pipe 1 may include one or more lines 8 for hydraulic fluid, electric cables or the like. The lines 8 are longitudinally oriented in a recess or recesses formed in the pipe, and each of the recesses communicates with a bore 7 formed at the pipe end section. At the pipe end, the bore 7 may advantageously be conically shaped by a reamer, and the line 8 may be expanded into contact with the wall at the outermost part of the conical section 9. Further, the line may advantageously be fixed in the bore 7 at the edge surface of the pipe end by diametrically opposed welded points (not shown) to hold the line in position in the bore prior to assembling the joint.

Figure 3A:
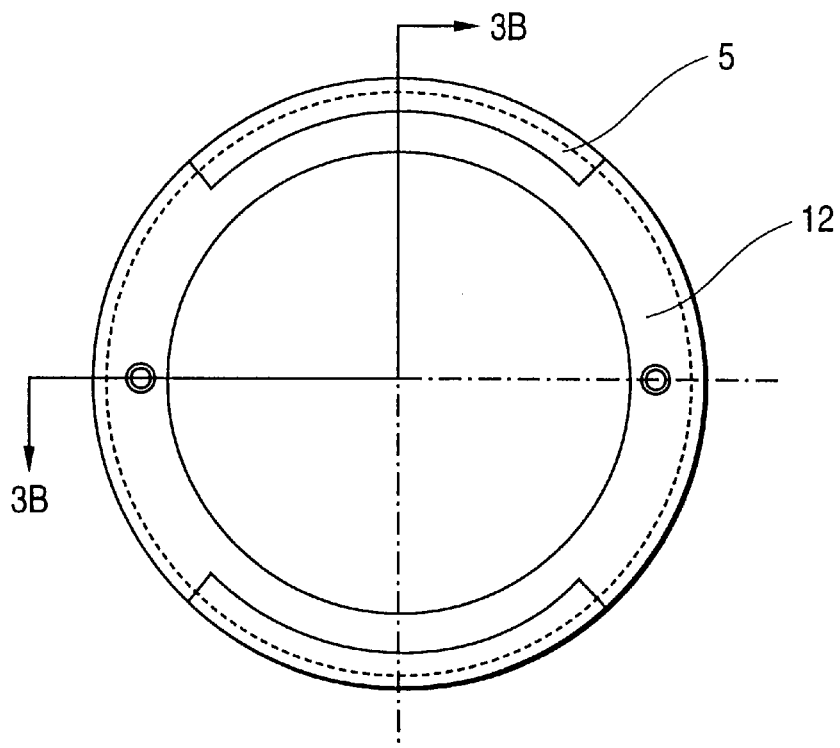
FIG. 3A is an enlarged end view of a joining part as shown in FIG. 1.
Figure 3B:
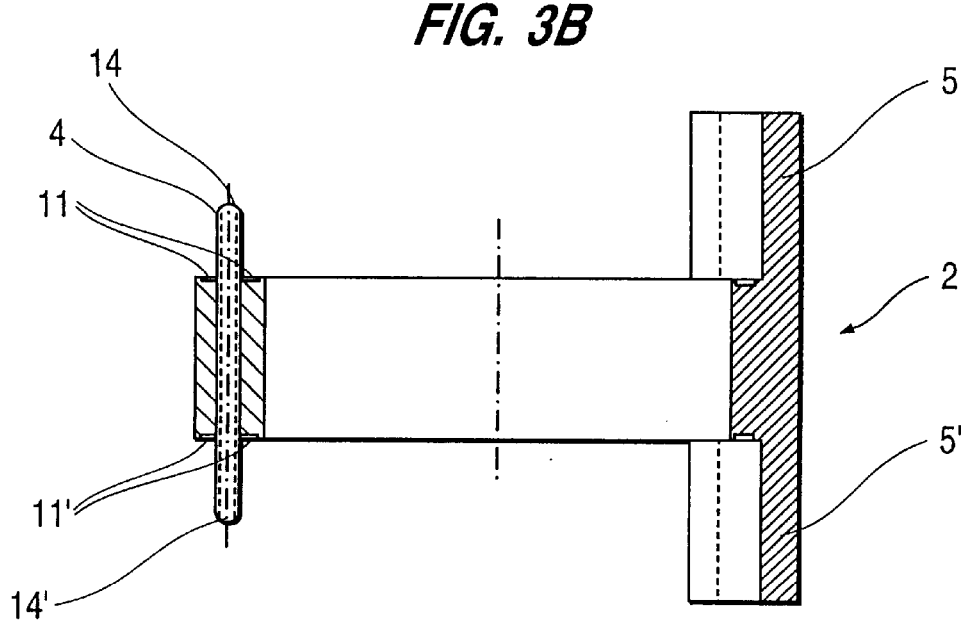
FIG. 3B is a sectional view taken along section lines 3B—3B.

As will be seen in FIG. 3 (see also FIG. 1), and as mentioned above, the joining part 2 has a couple of male parts 5, 5', shaped as diametrically opposed projections that correspond to the female parts 10, 10' at the pipe end sections 1, 1'. The male and female parts may advantageously have a tapered or minor conical shape at guiding edges 15, 15' and 16, 16'. The male and female parts serve both as a device for mutual centering of the two pipe end sections 1, 1', and as a locking device to inhibit mutual rotation of the pipe ends.

The joining part 2 is provided with one or more joining sleeves 4. Each joining sleeve 4 protrudes through a bore formed in the joining part. Also, each bore corresponds with one of the lines 8 positioned in the bores 7. The joining sleeve 4 is provided with conically shaped ends 14, 14', and when assembling the joint, the sleeves 4 will be pressed inwardly into the opening of the bore 7 such that a tight joint between the corresponding parts is achieved.

End surfaces 11, 11' of the joining part 2 and the end surfaces 12, 12' of the pipes may both advantageously be provided with labyrinth recesses (not shown) to support a lead packing or the like in order to obtain good tightness between the pipes.

Figure 4A:
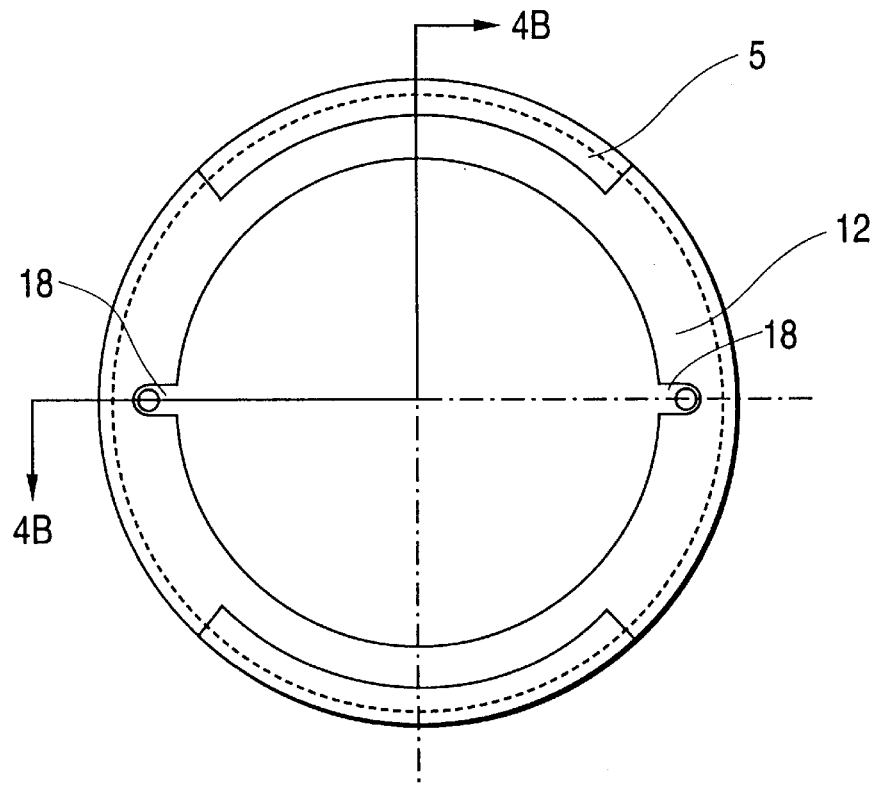
FIG. 4A is an enlarged end view of a variation of the joining part as shown in FIG. 1.
Figure 4B:
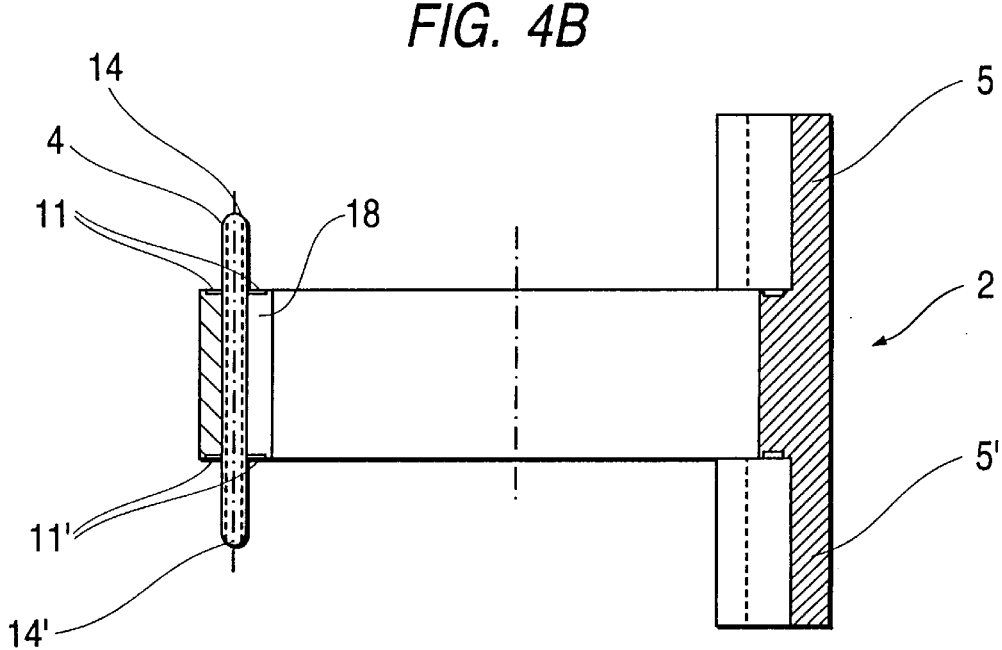
FIG. 4B is a sectional view taken along section lines 4B—4B.

The present invention is not limited to the above mentioned device for centering and locking which are formed as pairs of opposed male and female parts. The present invention may instead be provided with locking pins that protrude through bores in the joining part and into bores in the two pipe ends 1, 1' (not shown). The joining sleeves, instead of being arranged in bores through the joining part, may be arranged in longitudinal recesses 18 in the corresponding part as shown in FIGS. 4A and 4B.

As mentioned above, the pipes 1, 1' may be provided with longitudinal lines 8 or bores 7. This will depend upon the length of the pipes. Thus, for minor or short pipe lengths it will be relevant to provide the pipe with bores that pass from one end to the other. Also, the bores terminate in conical sections at the pipe ends. Larger pipe lengths may not be drilled throughout the entire pipe length, and therefore these pipes may be provided with thin conduits or lines 8 arranged in recesses in the pipes 1, 1'. Each of the lines will transition into bores 7 disposed at the end of the pipes 1, 1', as described in the embodiment above.

We claim:

1. A pipe joint assembly for joining opposing ends of two pipe sections which each include at least one longitudinal bore formed therein, said pipe joint assembly comprising:

a pipe union having first and second threaded sections for engaging mating threads of the two pipe sections, respectively, said first threaded section being formed in an internal peripheral surface at a first end of said pipe union, and said second threaded section being formed in an internal peripheral surface of said pipe union at a second end of said pipe union, wherein said first and second threaded sections are oriented in opposite directions; and a joining member insertable in said pipe union for mutually receiving, aligning and locking the two pipe end sections in the mutually aligned position; and at least one longitudinally extending joining sleeve connected to said joining member, said joining sleeve having a first end for engaging in the at least one bore formed in one of the two pipe sections and a second end for engaging in the at least one bore formed in the other of the two pipe sections.

2. The pipe joint assembly as claimed in claim 1, wherein said joining sleeve is arranged in a longitudinal bore formed in a wall of said joining member.

3. The pipe joint assembly as claimed in claim 1, wherein said joining sleeve is arranged in a longitudinal recess formed in a wall of said joining member.

4. The pipe joint assembly as claimed in claim 1, wherein said joining sleeve has first and second tapered ends for guiding said joining sleeve into the corresponding bores in the pipe sections.

5. The pipe joint assembly as claimed in claim 1, wherein each of the pipe sections includes diametrically opposed recesses formed in an outer peripheral surface thereof, and said joining member includes:

a first pair of diametrically opposed projections extending from a first end of said joining member for engaging in the diametrically opposed recesses of one of the pipe sections; and a second pair of diametrically opposed projections extending from a second end of said joining member for engaging in the diametrically opposed recesses of the other of the pipe sections.

6. The pipe joint assembly as claimed in claim 5, wherein each of said projections has edge surfaces which are tapered for guiding said projections into the corresponding recesses of the pipe sections.

7. A pipe joint comprising:

a first pipe section having an externally threaded end and at least one longitudinally extending passage formed in a wall of said first pipe section for receiving a conduit therein;

a second pipe section having an externally threaded end and at least one longitudinally extending passage formed in a wall of said second pipe section for receiving the conduit therein;

a pipe union having first and second internally threaded sections engaging said externally threaded ends of said first and second pipe sections, respectively, wherein said first and second internally threaded sections are threaded in opposite directions;

a joining member, inserted in said pipe union, for engaging and aligning said first and second pipe sections;

at least one joining sleeve extending through said joining member and engaging in said longitudinally extending passages formed in said first and second pipe sections so as to effect a tight seal therebetween.

8. The pipe joint as claimed in claim 7, wherein said joining sleeve is arranged in a longitudinal bore formed in a wall of said joining member.

9. The pipe joint as claimed in claim 7, wherein said joining sleeve is arranged in a longitudinal recess formed in a wall of said joining member.

10. The pipe joint as claimed in claim 7, wherein said joining sleeve has first and second tapered ends for guiding said joining sleeve into said longitudinally extending passages of said first and second pipe sections, respectively.

11. The pipe joint as claimed in claim 7, wherein each of said first and second pipe sections includes a pair of diametrically opposed recesses formed in an outer peripheral surface thereof, and said joining member includes:

a first pair of diametrically opposed projections extending from a first end of said joining member and engaging in said pair of recesses formed in one of said first and second pipe sections; and a second pair of diametrically opposed projections extending from a second end of said joining member and engaging in said pair of recesses formed in the other of said first and second pipe sections, wherein said first and second pair of diametrically opposed projections function to guide linear movement of said first and second pipe sections toward said joining member.

12. The pipe joint as claimed in claim 11, wherein each of said projections has edge surfaces which are tapered for guiding said projections into said corresponding diametrically opposed recesses of said first and second pipe sections.

13. The pipe joint as claimed in claim 7, further comprising a conduit provided in each of said longitudinally extending passages of said first and second pipe sections.

14. The pipe joint as claimed in claim 13, wherein each of said longitudinally extending passages of said first and second pipe sections includes an outwardly expanded conical portion at an end of said corresponding pipe section and said conduit is expanded into contact with said conical portion.

* * * * *